(12) United States Patent
Beecham (10) Patent No.: US 11,159,666 B1
(45) Date of Patent: Oct. 26, 2021

(54) VOICE SOUNDS CHARACTERISTIC OF A CELEBRITY CONFIGURED TO EMANATE FROM SPEAKER CO-LOCATED WITH FIGURINE RESEMBLING SAID CELEBRITY

(71) Applicant: James E. Beecham, West Palm Beach, FL (US)

(72) Inventor: James E. Beecham, West Palm Beach, FL (US)

( * ) Notice: Subject to any disclaimer, the term of this patent is extended or adjusted under 35 U.S.C. 154(b) by 0 days.

(21) Appl. No.: 17/223,399

(22) Filed: Apr. 6, 2021

Related U.S. Application Data

(63) Continuation-in-part of application No. 17/214,582, filed on Mar. 26, 2021, and a continuation-in-part of (Continued)

(51) Int. Cl.
*H04M 1/64* (2006.01)
*A63H 3/28* (2006.01)
(Continued)

(52) U.S. Cl.
CPC ....... *H04M 1/6033* (2013.01); *A63B 71/0622* (2013.01); *G06Q 30/0267* (2013.01); *G07F 17/323* (2013.01); *H04M 1/6025* (2013.01); *H04M 1/6041* (2013.01); *H04M 7/006* (2013.01); *A63B 2071/0625* (2013.01); *G07F 17/3288* (2013.01)

(58) Field of Classification Search
CPC .............. H04R 2420/07; H04R 1/1041; H04R 1/1083; H04R 1/1008; H04L 67/02; H04L 67/2838; H04L 63/029; H04L 65/4084; H04M 1/6033; H04M 7/006; H04M 1/6041; H04M 1/6025; G06N 20/00; G10L 13/033; G10L 13/00; G02B 2027/0178; G02B 27/017; G06F 3/013; G06F 3/017; G07F 17/323; G07F 17/3288
See application file for complete search history.

(56) References Cited

U.S. PATENT DOCUMENTS

8,068,873 B1 * 11/2011 Eberhard ............ H04M 1/6058
455/557
10,298,747 B2 * 5/2019 Clark ................ H04M 1/72475
(Continued)

*Primary Examiner* — Thuy Dao
(74) *Attorney, Agent, or Firm* — Christopher Pilling (57) ABSTRACT

A method and system for entertainment comprising sound-producing signals communication to plurality of bobble head/vibrational devices (BH/VDs). Typically, at least some of said produced sounds resemble a first voice at least resembling a first celebrity's voice and at least some of said produced sounds resemble a second voice at least resembling a second celebrity's voice. System typically uses VoIP, cell phone apps and BH/VDs to enable subscribers to service to hear from speakers linked to BH/VDs a conversation comprising sounds at least resembling a first celebrity's voice and said sounds at least resembling a second celebrity's voice. The origin of said sounds can be an actual human celebrity speaking, a celebrity voice impersonator speaking, or an electronic simulation of celebrity voice. The system can be used in the home of subscribers, such as with a private event for delivering entertainment, wagering advice; or for public events, such as exercise classes, game shows, live events, recommunication events, and sporting events.

22 Claims, 11 Drawing Sheets

Related U.S. Application Data application No. 17/075,213, filed on Oct. 20, 2020, now Pat. No. 10,978,205.

(51) Int. Cl.
   *H04L 29/08* (2006.01)
   *A63H 3/00* (2006.01)
   *H04M 1/60* (2006.01)
   *H04M 7/00* (2006.01)
   *G06Q 30/02* (2012.01)
   *G07F 17/32* (2006.01)
   *A63B 71/06* (2006.01)

(56) References Cited

U.S. PATENT DOCUMENTS

| | | | |
|---|---|---|---|
| 2002/0010584 A1* | 1/2002 | Schultz | G06Q 99/00 704/270 |
| 2007/0110031 A1* | 5/2007 | Szeto | H04M 1/2535 370/352 |
| 2009/0099836 A1* | 4/2009 | Jacobsen | G06F 40/58 704/3 |
| 2013/0309935 A1* | 11/2013 | Olson | A63H 3/20 446/330 |
| 2014/0049851 A1* | 2/2014 | Snell | F16M 11/041 359/871 |
| 2020/0296197 A1* | 9/2020 | Park | H04B 17/318 |

* cited by examiner

VOICE SOUNDS CHARACTERISTIC OF A CELEBRITY CONFIGURED TO EMANATE FROM SPEAKER CO-LOCATED WITH FIGURINE RESEMBLING SAID CELEBRITY

CROSS-REFERENCE TO RELATED APPLICATION

The present invention claims priority to non-provisional application Ser. No. 17/214,582 filed 26 Mar. 2021 by instant inventor, entitled "OPTIMIZING CLOUD ROBOTICS INTERACTIONS FOR CUSTOMERS", and non-provisional application Ser. No. 17/075,213 filed 20 Oct. 2020 by instant inventor, entitled "ROBOTS, SOCIAL ROBOT SYSTEMS, FOCUSING SOFTWARE DEVELOPMENT FOR SOCIAL ROBOT SYSTEMS, TESTING AND USES THEREOF", hereby incorporated in their entirety at least by reference.

1. FIELD OF THE INVENTION

The present invention generally relates to communication system comprising signals mirrored to external speakers. More specifically, the present invention relates to cell phones mirroring digital signals to external speakers optionally linked to bobble devices.

BRIEF SUMMARY OF THE INVENTION

In a preferred embodiment, instant invention comprises a network of cell phones receiving signals relating to spoken comments. In a preferred embodiment, such signals begin as voice sound waves, such voice sound waves then rendered to digital format signals.

In a preferred embodiment, such spoken comments originate from at least one celebrity commenting about a public event. In a preferred embodiment, said spoken comments are delivered to subscribers of a communication network. In a preferred embodiment, said communication network comprise internet-carried digital signals delivered to subscribers via cell phones, such cell phones mirroring said signals to speakers external of said cell phones.

In a preferred embodiment, said communication network comprises Android operating system cell phones, said Android cell phones optionally operating in a 'group chat' mode. In a preferred embodiment, said phones optionally use Google Duo application (pre-installed on some Android devices) or Google Hangout app, or adapt other popular VoIP (voice over internet protocol) apps.

As background, Voice over Internet Protocol (VoIP), is a technology that allows you to make voice calls using a broadband Internet connection instead of a regular (or analog) phone line. In a preferred embodiment, instant invention communication network comprises receiving spoken words into system microphone, such as celebrity speaking into microphone of a first cell phone of system.

In a preferred embodiment, said first cell phone uses Android operating system and operates using Google Duo application or the like. In a preferred embodiment, said first cell phone receiving spoken words transmits corresponding signals to system subscribers cell phones.

In a preferred embodiment, said system subscriber cell phones are enabled within system within same Android app to receive digital signals. In a preferred embodiment, using said Google Duo app or the like, said first Android cell phone renders said microphone-received sound waves into digital format signals.

In a preferred embodiment, said digital format signals are electronically duplicated, such as by using a splitter or signal duplicator. In a preferred embodiment, said multiple alike digital signals are routed via internet connections to each of a plurality of signal-receiving Android cell phones operating Goggle Duo application within system. In a preferred embodiment, said receiving cell phones are designated within app of instant communication network wherein said Android cell phones of subscribers are registered to receive said corresponding signals.

In a preferred embodiment, said plurality of 'digital-signal-receiving' cell phones each comprise cell phone of system serving at least one user subscriber of instant invention's communication network. In a preferred embodiment, each of said 'digital-signal-receiving' cell phones is registered in system Goggle Duo application and designated as eligible to receive system digital group chat signals according to terms of user subscriptions.

In a preferred embodiment, each of said signal-receiving cell phones further operates using 'signal casting' application, such app also known as 'mirroring' app. Signal casting or mirroring is a process by which a signal received by a first device, such as a cell phone, and signal is then electronically forwarded or 'mirrored' or 'cast' wirelessly to a second device, such as speaker external to the said receiving cell phone.

Said 'casting' can be accomplished in the case of signal-receiving Android cell phone of instant invention by use of Android 4.4 or higher software as herein disclosed. Such 'casting' can be accomplished in the case of non-Android equipment by use of blue tooth app, blue tooth equipment and wireless signal.

In a preferred embodiment, said 'mirrored to' device external to said Android signal-receiving cell phone is a 'casting-enabled' speaker or amplifier. In a preferred embodiment, said 'signal-casting' or 'mirroring' is enabled within subscriber chat group Android cell phones by said cell phone using Android 4.4 or higher software, and such software set to Google Play Services.

In a preferred embodiment, each said receiving Android cell phone using Google Play Services is further set as 'Microphone permission on'. In a preferred embodiment, said each receiving Android cell phone of instant invention communication network comprises a pair with a respective mirroring-capable speaker external to said receiving cell phone. Typically, said casting-enabled speaker is located near to subscriber and near to receiving cell phone so that forwarded commentary voice sounds reach subscriber ears.

In a preferred embodiment, each of said plurality of mirroring-enabled external speakers plays the voice commentary said subscriber signed up to receive from respective celebrity during the public event. In a preferred embodiment, such commentary is heard by nearby subscriber's ears while subscriber watches live public event, such as TV screen of other network.

In a preferred embodiment, each of the said 'casting-enabled' linked external-to-receiving-cell-phone speakers or amplifiers has a linked bobble head/vibrational device (BH/VD). In a preferred embodiment, said BH/VD can be initiated to move or bobble or vibrate, such as by electronic signal initiated by cell phone programming. In a preferred embodiment, such BH/VD movement is initiated by wireless signal simultaneous to when cell phone 'casts' commentary signal to said speaker. In a preferred embodiment, user's finger can depress power supply switch manually to activate movement motor of BH/VD.

A bobble head/vibrational device can comprise a simulated head or helmeted head atop a lower member (i.e., the rest of a body) to create a figurine, typically said figurine simulating either a human form or animal or otherwise. Typically, such figurine is mechanically able, at least in part, to bobble and/or wobble and/or nod and/or vibrate or a combination.

Bobble head/vibrational devices (BH/VDs) can comprise rigid plastic such as polycarbonates, polyvinylchloride [PVC], acrylonitrile butadiene styrene [ABS], and/or one or more of materials such as metals, glass, crystal, wood, and/or other materials. BH/VDs are sold for use both as toys and as novelty items. BH/VDs are sometime given away for free as a promotional item.

For example, it is not uncommon to see a bobble head/vibrational figurine that resembles a popular character commonly associated with a fast-food restaurant. Such a BH/VD figurine can be mounted atop a dashboard of an automobile. The bobbling of the head can amuse the driver and the caricature itself can remind passengers of the brand of restaurant, thereby serving an advertising function for that brand of restaurant.

The typical bobble head/vibrational device as herein defined comprises one or more movements which user can activate, such as bobble/nod/wobble movement of head and/or helmet on head and/or vibrational action of body. Such movements typically affect at least a portion of the figurine on pedestal.

A simple form of enabling a bobble head/vibrational moving element can be comprised as a spring that is disposed intermediate the head and the lower member or body of the figurine. Typically, the spring suspends the simulated head above the body and allows the head to shake slightly up or down, tilt from side to side, forward and back, and even to rotate slightly about a center longitudinal axis (i.e., to turn from right to left).

The head nods or wobbles or "bobbles" in response to movements that are incurred by the body. The spring transfers energy (kinetic) between the body and the head to impart a range of motion to the head relative to the body that appears to bring a level of animation to the head and figurine. This animation type movement can increase both the realism and novelty of the figurine.

The movement of the head can occur when the base is jostled, such as bobble head mounted on dashboard of car with head moving due to vehicle bounce during driving. Another common type of bobble head/vibrational device movement is enabled by vibratory component in the base of device. Typically, such vibratory component is comprised as a motor or other electromechanical and/or magnetic means within the pedestal.

For the vibratory component, typically a motor drives an agitator that lifts and releases the supporting platform, thereby imparting an oscillating motion to a bobble head/vibrational device, such as supported on a platform. The agitator optionally includes engagement portions that lift the supporting platform. The motor optionally has variable speed and optionally agitator elements having different profiles that may be interchanged to achieve a greater variability of the oscillating motion.

Moreover, with optional hinge attachment, the bobble head/vibrational device's position and corresponding movement may be varied by changing its location on the supporting platform. A riser element may also be placed under the BH/VD to increase the instability of the BH/VD and provide for further varying the bobble head/vibrational device's motion.

As is well known in the art, an audio speaker or amplifier can be linked to the bobble head/vibrational device (BH/VD). Such speaker can be comprised in the BH/VD base and supplied with electrical power in one of several means, such as by battery or by wired connection to external circuit. Speaker circuit can receive wired or wireless audio signals to enable sounds to emanate from BH/VD the speaker. As noted in prior art, said sounds can comprise audible music or a buzzer signal, such as where BH/VD serves as alarm clock.

In a preferred embodiment, instant invention comprises an internet/cloud-linked communication network comprising a plurality of bobble head/vibrational devices each receiving a contemporaneous audio signal. Each BH/VD of the plurality has a similar figurine and each at least one linked audio speaker.

In a preferred embodiment, communication operations are controlled via use of cell phone application software instructions. In a preferred embodiment, communication operations use voice over internet protocol equipment and functionality, such as digital encoder to change spoken analog sounds into digital signals.

In a preferred embodiment, said digitally encoded sounds are electronically dispatched by router to said speakers simultaneously or at least concomitantly. In a preferred embodiment, said digitally encoded sounds are recorded and recommunication according to a schedule, such as matching to time of playing of related video recording.

In a preferred embodiment, instant invention system can comprise a combination of Android-enabled cell phones, linked bobble head/vibrational devices with figurines and speakers, voice processors, power supplies, cell phones with enabling mirroring-application software, data files, audio signal digital encoder, digital signal routing equipment, memory devices, analytical components, voice over internet protocol (VoIP), Android app instructions, internet connections, cloud computer configuration, and common types of wired and wireless communication (Blue tooth/cast/mirrored) links. In preferred embodiments, as herein disclosed, these components operate in combination to enable the functionalities herein disclosed.

In a preferred embodiment, said network of BH/VDs comprises a first plurality of said bobble head/vibrational device figurines each depicting a first celebrity. Said plurality each comprises a linked speaker. Each BH/VD of said first plurality and depicting said first celebrity delivers to users via each said speaker and simultaneously, sounds at least reminiscent of voice characteristics of speech of said first celebrity.

In a preferred embodiment, said network of BH/VDs comprises furthermore, a second plurality of said bobble head/vibrational figurines, each figurine depicting appearance reminiscent of a second celebrity. In a preferred embodiment, each BH/VD of said second plurality depicting said second celebrity delivers to users by their respective speakers, sound at least reminiscent of voice characteristics of speech of said second celebrity.

In a preferred embodiment, said network of BH/VDs comprises the said first celebrity-resembling BH/VD figurines and the said second celebrity-resembling BH/VD figurines. In a preferred embodiment, said figurines operate together to provide to users at least a simulation of conversation. In a preferred embodiment, said conversation comprises sounds at least reminiscent of voice characteristics of speech conversation between said first and said second celebrities.

In a preferred embodiment, the audio signals driving said first-celebrity-voice-resembling BH/VD-delivered sounds via BH/VD-linked speakers are of origin in at least one of list: actual first celebrity speaking, either live or recorded, at least one human whose speech is transformed to mimic said first celebrity's speech sounds, at least one human impersonating speech of said first celebrity. In a preferred embodiment, the audio signals driving said second-celebrity-voice-resembling BH/VD-delivered sounds via BH/VD-linked speakers are of origin in at least one of list: actual second celebrity speaking, either live or recorded, at least one human whose speech is transformed to mimic said second celebrity's speech sounds, at least one human impersonating speech of said second celebrity.

Voice transformation is well known in the art. There are many uses currently for voice transformation. The following are some examples: Film dubbing. This allows one actor to dub several voices in a film. Telecom services. Various services allow a caller to modify his voice. For example, sending a birthday greeting to a child with his favorite cartoon character or a celebrity voice. Online chat. Chatting text and SMS (Short Message Service) can be converted into speech with a voice which sounds like the speech of the sender's voice.

In a preferred embodiment, instant invention communications to connected BH/VDs the audio created from humans who are imitators/impersonators of celebrity voices. In a preferred embodiment, instant invention communications to connected BH/VDs the audio comprising at least one celebrity's actual voice, either live or recorded, edited or unedited.

In a preferred embodiment, said first celebrity speech sounds (actual first celeb speaking or first-celebrity impersonator speaking or synthesized speech mimicking first celeb) are used via system in conjunction with an event. Such event can be a private event such as game viewing at home on TV, birthday celebration or small wedding. Such event can be a public event such as audience at a game show or exercise class.

In a preferred embodiment, said first celebrity speech sounds in conversation with second celebrity speech sounds are used via system in conjunction with an event. Such event can be private or public. Examples of such public events comprise sports event, political event, public gathering.

In a preferred embodiment, said speech sounds communication are synchronized to happenings in said events, such as comments in speech sounds regarding a play in a sports game. In a preferred embodiment, such synchronization is accomplished manually, such as by having audio played by sound engineer from choice of recordings.

In a preferred embodiment, two celebrities watch a live TV communication and each celebrity comment after hearing a comment from the other celebrity. In a preferred embodiment, such conversation effect of sounds is enhanced by activation of figurine movement of BH/VD figurines, as activated by cell phone app enabled signal initiated by user via internet link to motor of each figurine involved.

BRIEF DESCRIPTION OF THE FIGURES

Other features and advantages of the present invention will become apparent when the following detailed description is read in conjunction with the accompanying drawings, in which.

DETAILED DESCRIPTION OF PREFERRED EMBODIMENTS

Figure 1A:
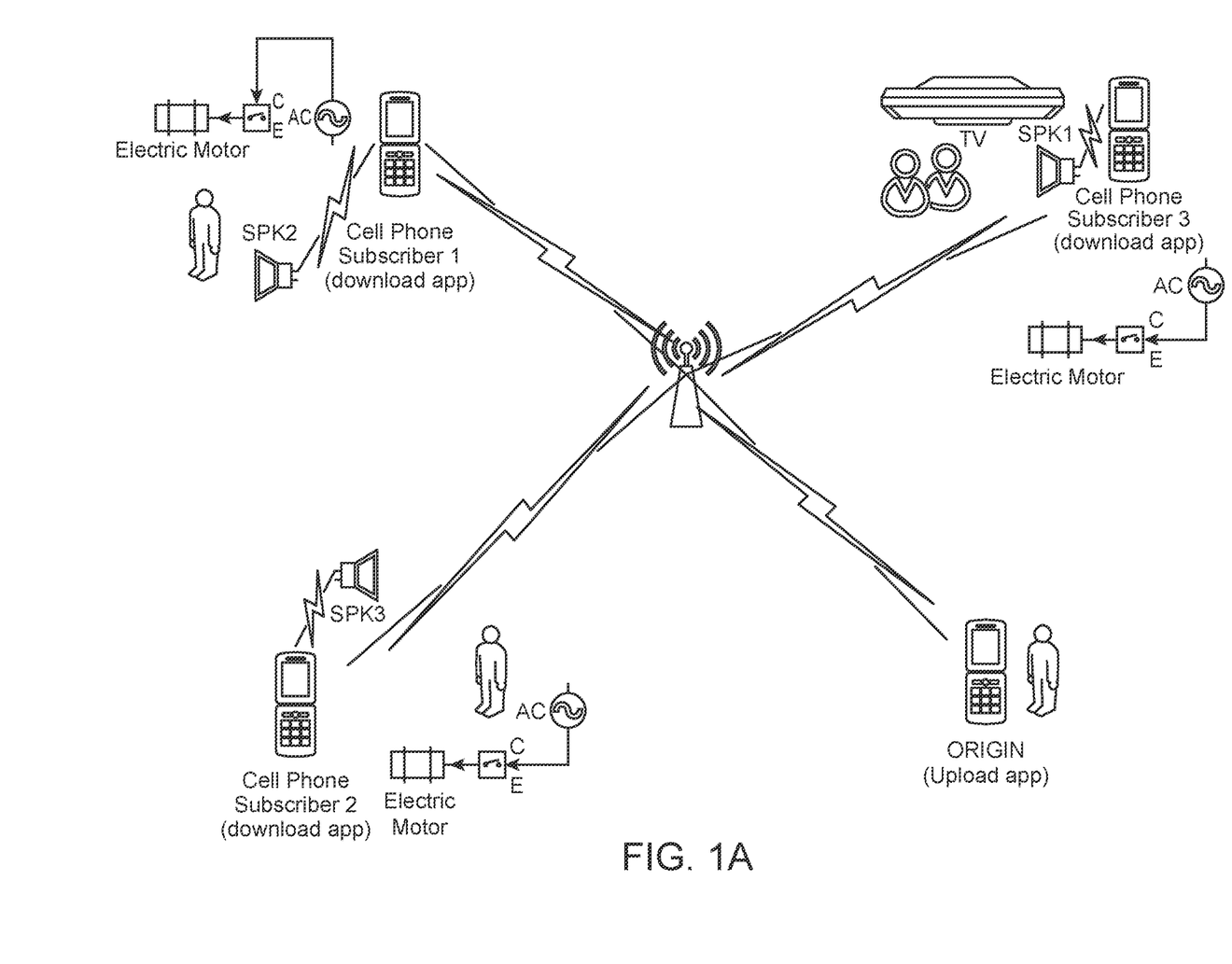
FIG. 1A is a schematic illustrating details of a preferred embodiment.

In FIG. 1A, a schematic of a preferred embodiment of instant invention is illustrated wherein a person at Origin (bottom right) speaks into first cell phone of system. Cell phones in system are Android phones using Google Duo app and using Google Play Services set to mirror signal to designated speakers (Speakers of subscribers 1,2,3). Three subscribers are illustrated, top left and top right and bottom left. Each subscriber has an Android cell phone set to group chat VoIP, thus receiving the digital signal corresponding to spoken words of Origin person. Said digital signals are mirrored or 'cast' to the respective speaker located near to each of the three subscribers. At each subscriber location is also present a motor with electric supply and on-off switch. These motors are optionally attached to BH/VDs (bobble head/vibrational devices—see FIG. 1B). When motor is activated by subscriber, that will cause the bobble or nod or vibration to occur in the BH/VD.

Figure 1B:
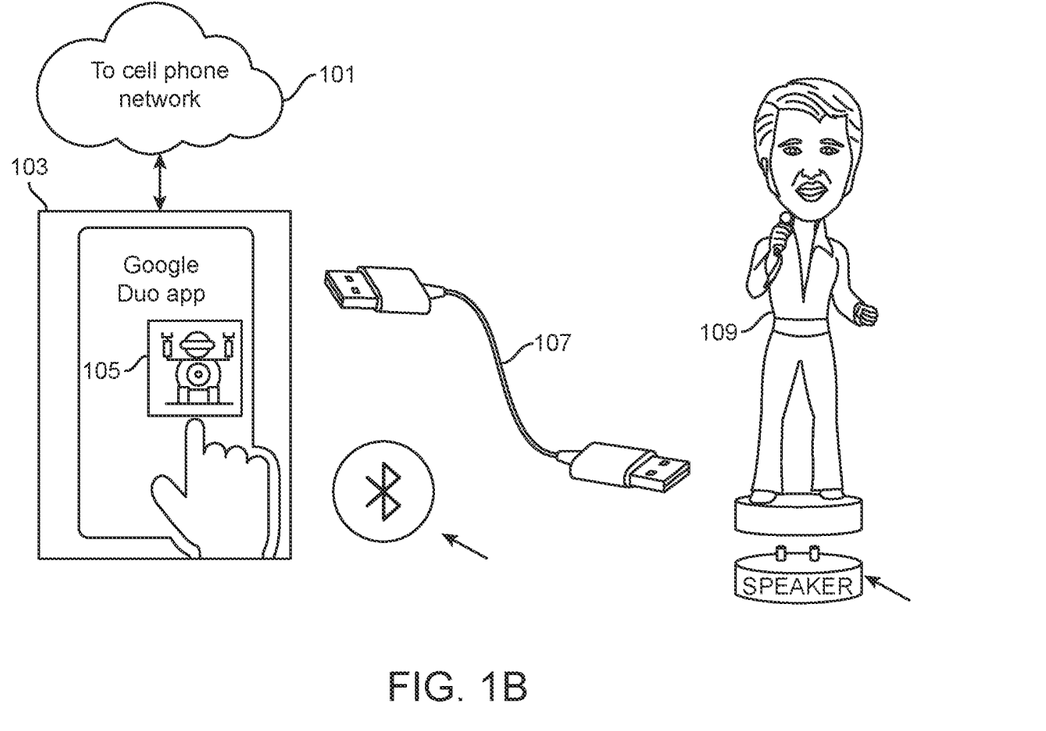
FIG. 1B is a schematic illustrating details of a preferred embodiment.

In FIG. 1B, a schematic of a preferred embodiment of instant invention is illustrated wherein a BH/VD (bobble head/vibrational device) 109 is located near to networked cell phone 103 of subscriber. Said Android cell phone operates app Google Duo 105, and thus is enabled to receive from Origin the signals corresponding to spoken words of person speaking at Origin. Figurine 109 resembles celebrity Elvis Presley. From signal-receiving and mirroring cell phone 103, the app is operating to 'cast' or 'mirroring' incoming group chat signal to speaker (right arrow). Said mirroring can be via blue tooth/or Google Play Services app. In a preferred embodiment, the person speaking at Origin is an Elvis voice impersonator, and thus the sounds emanating from speaker resemble voice of Elvis Presley. Connection of speaker can be to base of pedestal of figurine. Power supply to speaker can be via wired connection 107.

In FIG. 1B, the illustrated figurine comprises head and body positioned on a pedestal. It is understood that 'Celebrity' within instant invention can be a human person, living or dead, one of great fame or only locally known, or non-human celebrity such as a brand-related character such as Buzz Lightyear representing the brand of Disney movies. For voice of Buzz Lightyear, in a preferred embodiment, a Tim Allen impersonator could render the imitated voice.

In a preferred embodiment, the sounds mimicking or representing speech of celebrity arise as one of: actual celebrity human speech, recorded or live, or as speech of voice impersonator, or from use of electronic processing/synthesis, such as speech of a person modified by signal processing parameters to mimic spoken words of celebrity. Such sounds played by said speakers are heard by ears of nearby located subscribers of system.

Figure 2:
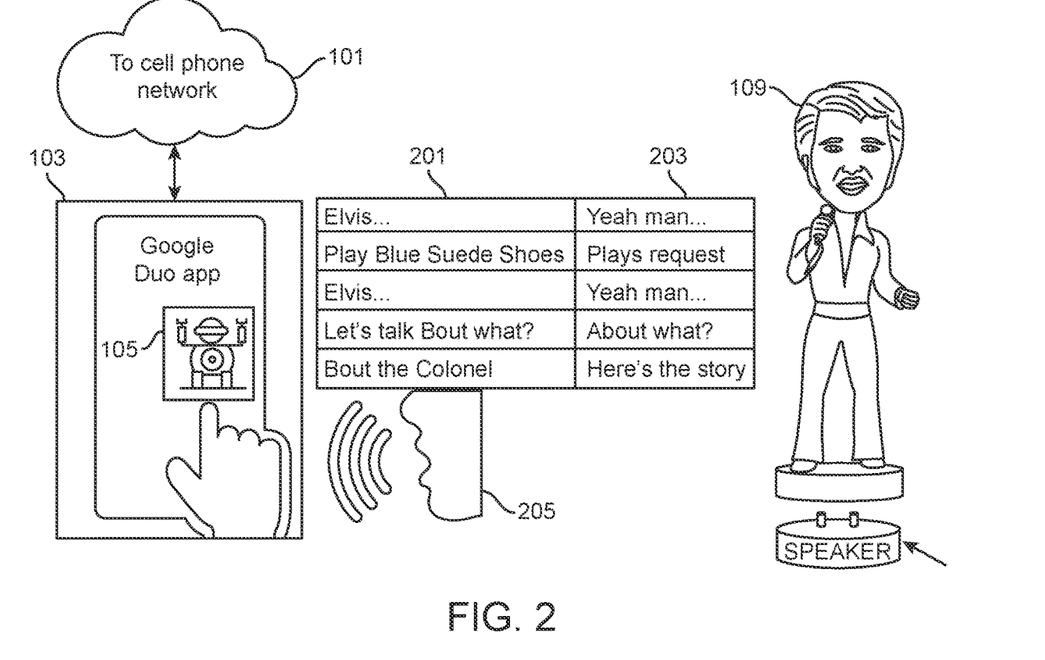
FIG. 2 is a schematic illustrating details of a preferred embodiment.

In FIG. 2, a preferred embodiment of instant invention is illustrated wherein a user/interviewer 205 speaks into microphone of cell phone of network. In a preferred embodiment, said input signal of user spoken word is processed by comparison to a script in files of system. Where input words fit script, the corresponding memory file of 'interviewer' sound bite is played in sequence. Said interviewer sound bite and said corresponding recorded impersonator sound bite, together are transmitted to receiving cell phones of network by sound engineer. In this manner, the mirrored signals and sounds emanating from subscriber speakers comprise a conversation. For example, 'interviewer' can speak words 'Let's talk . . . ' and the sound engineer records that, plus he recognizes the input and attaches to the recorded sound bite a response in conversational context: 'About what? as recorded by Elvis impersonator. Then sound engineer sends the two bites in order together to receiving cell phones.

Figure 3:
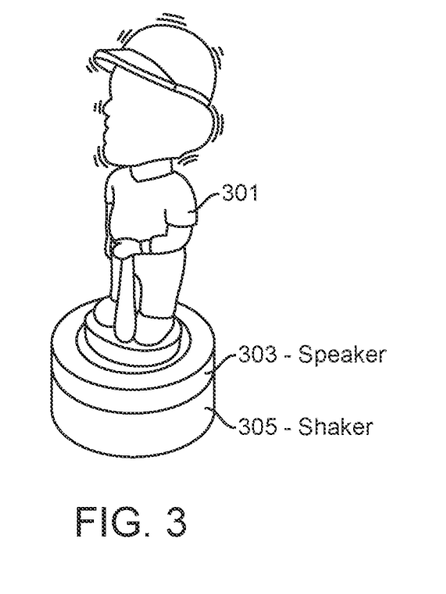
FIG. 3 is a schematic illustrating details of a preferred embodiment.

In FIG. 3, a preferred embodiment of instant invention is illustrated wherein the bobble head/vibrational device figurine 301 is comprised of a spring mounted head on body supported on base comprising speaker 303 and vibratory shaker 305. In a preferred embodiment of instant invention, vibratory movement is activated. This causes bobble to occur due to electromechanical vibrator motor vibrating the figurine.

Figure 4:
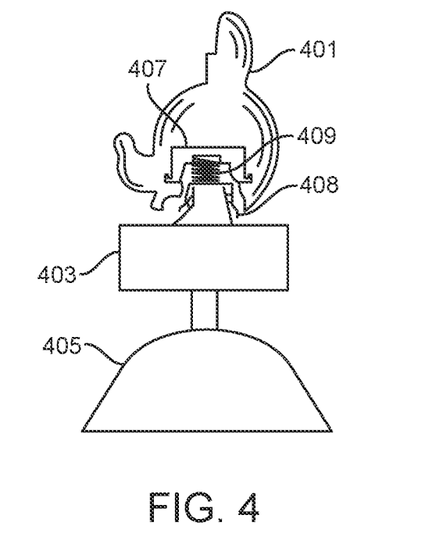
FIG. 4 is a schematic illustrating details of a preferred embodiment.

In FIG. 4, a preferred embodiment of instant invention is illustrated wherein bobble head/vibrational device 401 comprises an animal figure of duck style. Duck head with spring is removably attached by clip-on base cone 408 snugged to mount at top of speaker 403. In this manner, one head can be exchanged for another head.

Figure 5:
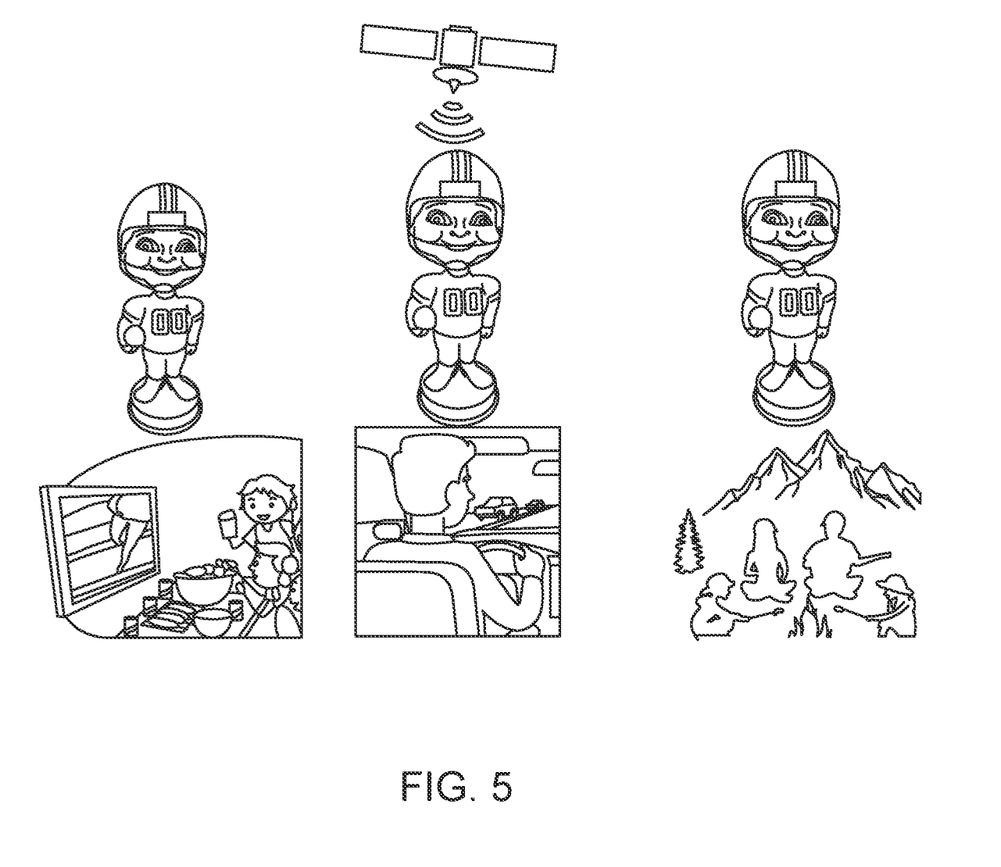
FIG. 5 is a schematic illustrating details of a preferred embodiment.

In FIG. 5, a preferred embodiment of instant invention is illustrated wherein cell phone network delivers mirrored signals to a plurality of bobble head/vibrational devices with base-mounted speakers. Said signals can comprise a scheduled communication. Such schedule can be commentary delivery at time of a live football game. Said game is viewed by fan at bottom left, but fan in car (bottom middle) and fans in campground (bottom right) do not see the video.

Figure 6:
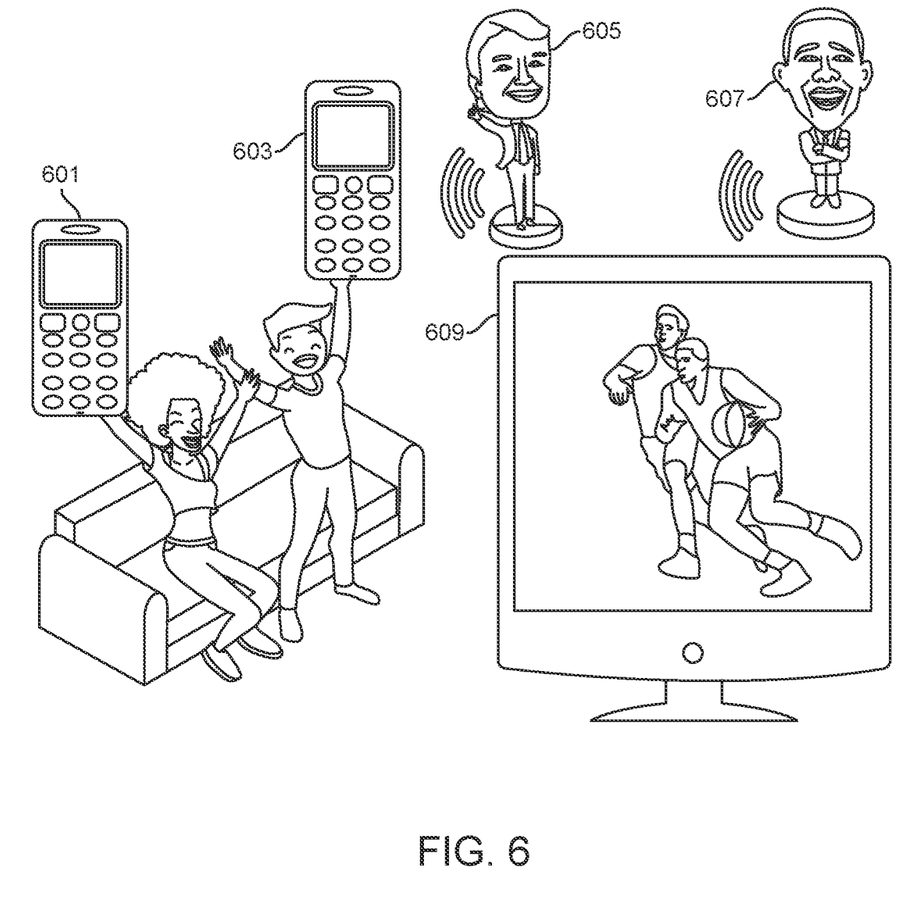
FIG. 6 is a schematic illustrating details of a preferred embodiment.

In FIG. 6, a preferred embodiment of instant invention is illustrated wherein a first bobble head/vibrational device celebrity figurine 605 is mounted atop the left side of a television, and a second bobble head/vibrational device celebrity figurine 607 is mounted atop the right side of said television. The television programming comprises a scheduled viewing of a live basketball game 609, being watched of TV. The users of the instant invention network of cell phones have turned off the audio of the TV and listen only to the two speakers mounted respectively on base of each of said two bobble head/vibrational devices. A first user has obtained via mirroring app on his cell phone 603 the signals producing celebrity speech sound emanating from speaker of said first bobble head/vibrational device celebrity figurine 605. Furthermore, a second user has obtained via mirroring app on her cell phone 601 the signals producing celebrity speech sound emanating from speaker of said second bobble head/vibrational device celebrity figurine 607. In a preferred embodiment, said audio signals are timed to provide a conversation between the first celebrity speech sounds and the second celebrity speech sounds. In a preferred embodiment, said conversation at least references the plays of the game.

Figure 7:
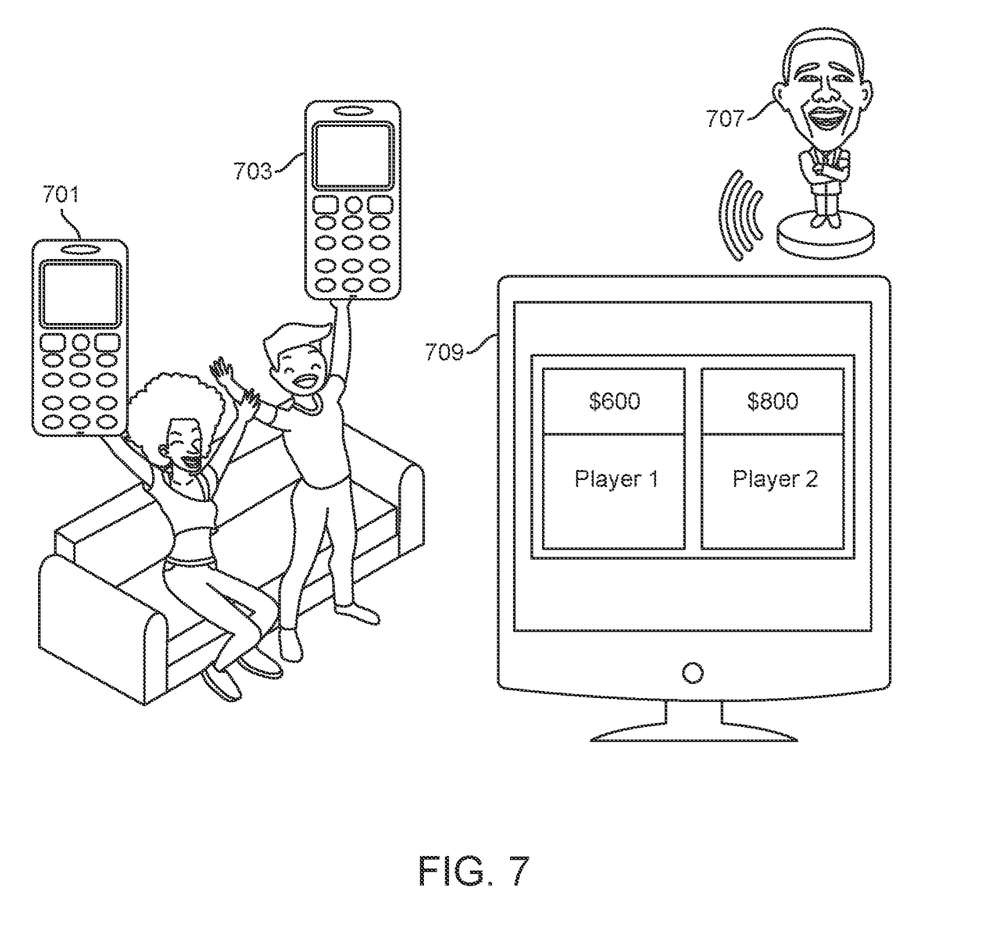
FIG. 7 is a schematic illustrating details of a preferred embodiment.

In FIG. 7, a preferred embodiment of instant invention is illustrated wherein a first bobble head/vibrational device celebrity figurine 707 is mounted atop the right side of a television being viewed by users holding cell phones 701 and 703. The television screen displays a video broadcast of onscreen game being played by said two users, one as player 1 and the other user as player 2. The celebrity voice sounds emanating from speaker located in base of bobble head/vibrational device 707 comprise words of hosting of the video game. A first user has obtained via app on his cell phone 703 the signals producing and enabling his choices in game, communicated over his chat app to sound and video engineers of system. Furthermore, a second user has obtained via app on her cell phone 701 the signals producing and enabling her choices in game communicated over his chat app to sound and video engineers of system.

Figure 8:
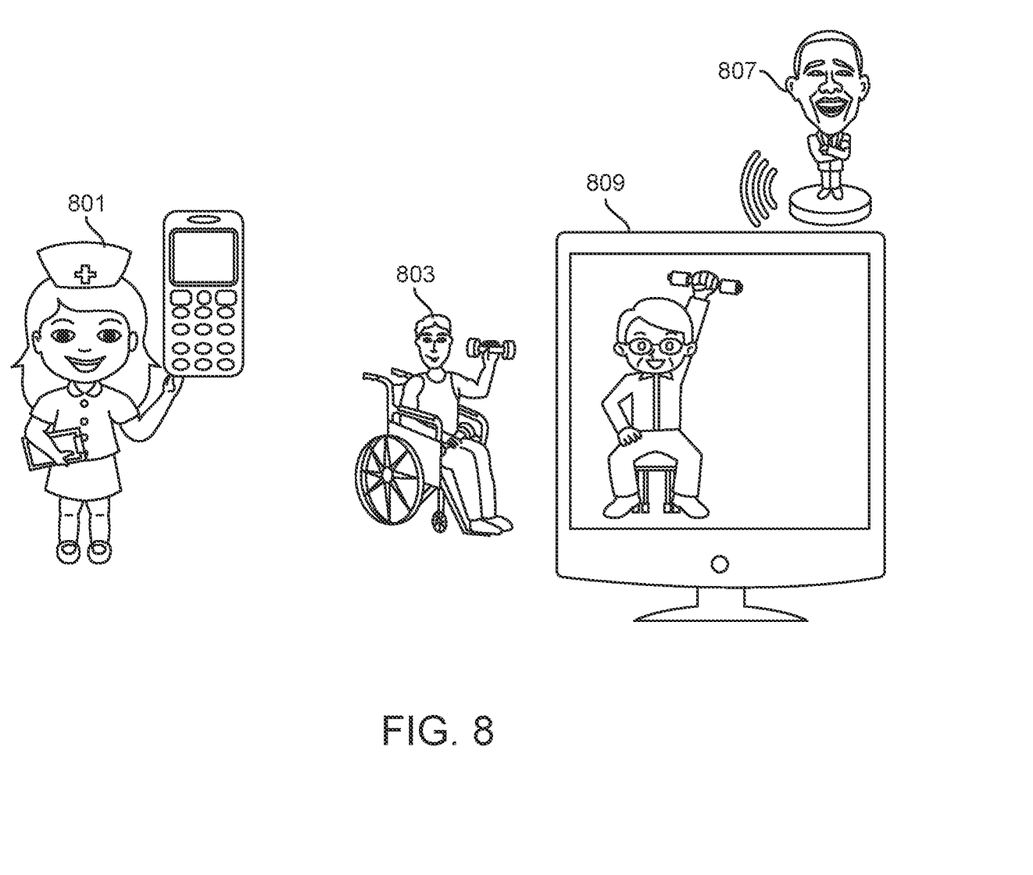
FIG. 8 is a schematic illustrating details of a preferred embodiment.

In FIG. 8, a preferred embodiment of instant invention is illustrated wherein a first bobble head/vibrational device celebrity figurine 807 is mounted atop the right side of a television being viewed by a first user comprising nurse holding cell phones 801 and a second user comprising man 803 exercising in wheelchair. Said man in wheelchair is watching video 809 on TV and listening to audio of speaker mounted in base of bobble head/vibrational device 807. The nurse has keyed into the cell phone app the data needed to activate the words of bobble head/vibrational device speaker and the video display. The man in the wheelchair benefits from the encouragement to his exercise from the words emanating from the speaker.

Figure 9:
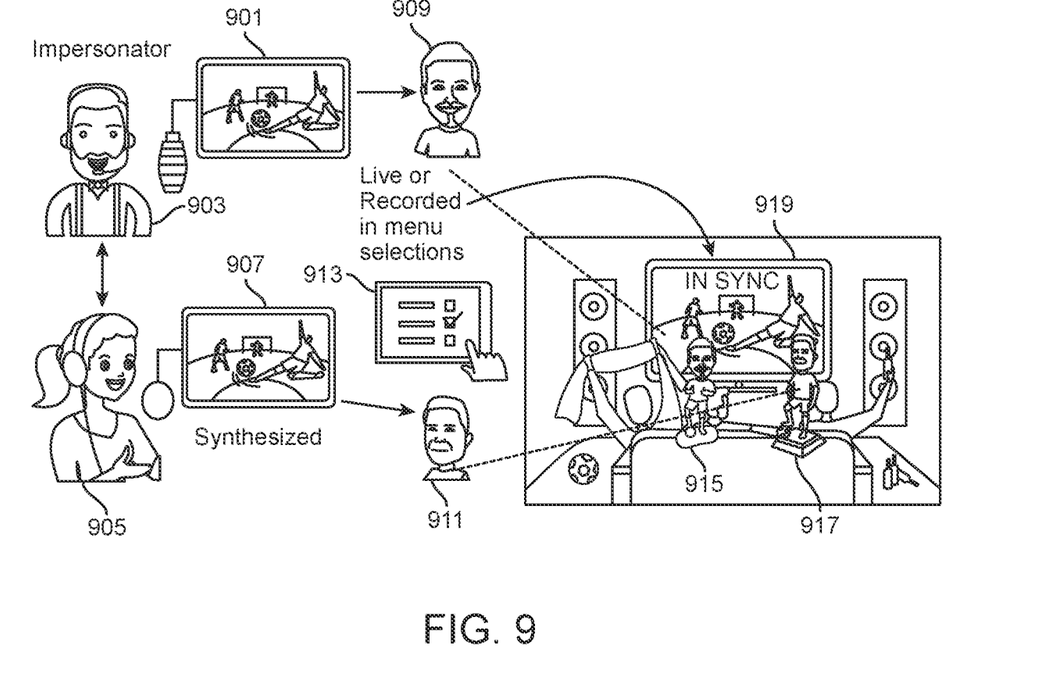
FIG. 9 is a schematic illustrating details of a preferred embodiment.

In FIG. 9 is illustrated a schematic of a preferred embodiment. At bottom right of schematic is group of friends sitting on couch watching a television on which is playing a soccer game. On the back of the couch are mounted two BH/VDs. BH/VD 915 comprises a figurine of athlete A and BH/VD 917 comprises a figurine of athlete B. Athletes A and B are each celebrities of the sport of soccer. The game proceeds with speakers of TV turned off. Meanwhile audio is heard in the room, from each of the speakers in the two BH/VDs.

Said BH/VD speaker 915 audio comprises words of speech at least mimicking athlete A coming from speaker of figurine 915. Said BH/VD speaker 917 of figurine 917 emanates words of speech at least mimicking athlete B. The words from the two BH/VD speakers comprise a conversation. Impersonator 903 of voice and synthesizer of voice 905 can have sound bites of celebrity-resembling-voice comments recorded by sound engineer on recorder 913.

Figure 10:
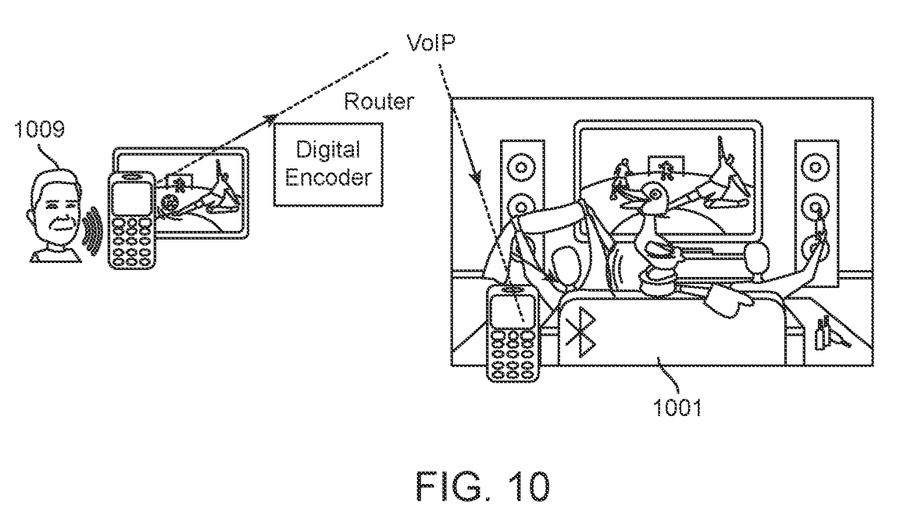
FIG. 10 is a schematic illustrating details of a preferred embodiment.

In FIG. 10 is illustrated a schematic of a preferred embodiment wherein a tout (advisor on odds in wagering) 1009 is providing commentary via cell phone app while watching live soccer game. Said speech is processed by cell phone app software including digital encoding of the sounds and altering the speech to resemble another persona, the 'duck tout' persona. Such altered digital signals are routed using 'voice over internet protocol' or VoIP means to deliver speech sounds to bobble head/vibrational device 1001 speaker. Subscribing user is watching the same soccer game as tout 1009. Subscribing user is enabled to access the wagering advice from anonymous 'duck tout'.

Figure 11:
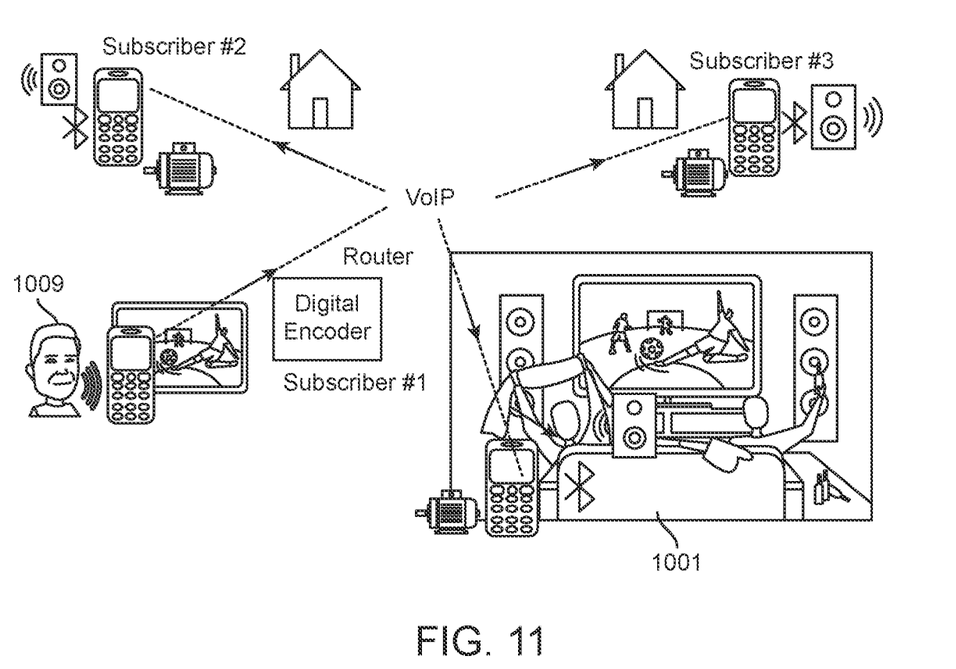
FIG. 11 is a schematic illustrating details of a preferred embodiment.

In FIG. 11 is illustrated a schematic of a preferred embodiment wherein sports celebrity 1109 watches sports game (bottom left) and speaks his commentary as game is being played. Through use of digital encoder, router and voice over internet protocol, the spoken words of sports celebrity are transmitted over internet to three subscribers illustrated. The subscribers receiving cell phones mirror the signal to each a speaker near them in their respective homes. Each subscriber has near him a bobble head/vibrational device (not shown) of same one of the teams playing in the game on TV. When their team scores, each subscriber turns on the switch for the motor near each subscriber, thus vibrating the base of the figurine near each subscriber and causing the bobble to happen in the figurine. This enhances the experience of the score for the subscriber.

Although the invention has been described in considerable detail in language specific to structural features, and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated and can be made without departing from the spirit and scope of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A communications system comprising:
at least one system signal comprising origin as human voice sound waves, a plurality of cell phones operating in voice over internet protocol and mirroring signals to speakers located external to said system cell phones, receipt of processed signals audibly by at least one user/subscriber via speaker audio, said system further comprising at least one bobblehead figurine matched to at least one characteristic/resembling feature of at least one of system's voice signals, and wherein at least one of system's signals is cell-phone-cast to at least one of system-linked speakers, and wherein at least one bobblehead figurine of system comprises at least one of list: living-human figurine, deceased-human figurine, fictional character figurine, brand-representational figurine, and animal figurine.

2. The system of claim 1, further comprising at least one interaction of at least one user/subscriber of system with at least one system signal, such as listening to said sound, during time said user/subscriber accesses at least one system-signal-related TV program/video.

3. The system of claim 2, further comprising at least simulated sounds of at least a first celebrity speaking.

4. The system of claim 1, further comprising at least one of celebrity spoken voice input, impersonated celebrity voice input, synthesized celebrity voice input.

5. The system of claim 1, further comprising at least simulated sounds of a first celebrity and at least a second celebrity in conversation.

6. The system of claim 1, further comprising at least one movement of bobble, nodding, wobbling, vibration of at least one bobble head/vibrational device, said movement induced by at least one of system user and system cell phone.

7. The system of claim 1, further comprising at least one of list: advice regarding wagering, sports commentary, exercise commentary, game show hosting.

8. A method comprising a step of communicating words in voice of a first celebrity, said words delivered via internet, said delivery comprising signals mirrored from receiving cell phone to at least one speaker in a bobble head/vibrational device (BH/VD) resembling said celebrity.

9. The method of claim 8, further comprising step of emanating from at least one speaker at least one sound of list: actual human first celebrity speaking, voice impersonator speaking as said first celebrity, electronic simulation of voice of said first celebrity.

10. The method of claim 8, further comprising step of delivering said celebrity words in context of at least one of list: sporting event, game show, exercise class, wagering advice.

11. The method of claim 8, further comprising step of comprising said words as part of a conversation.

12. The method of claim 11, further comprising step of comprising said conversation as between celebrities.

13. The method of claim 8, further comprising step of inducing movement in said bobble head/vibrational device (BH/VD).

14. A system comprising an originating cell phone and communication of signals using VoIP (voice over internet protocol), said communication from h originating cell phone to plurality of signal-receiving cell phones wherein each of said receiving cell phones casts said received signals to speaker linked to bobble head/vibrational device (BH/VD).

15. The system of claim 14, further comprising at least one of said signals corresponding to sounds at least resembling voice of a celebrity.

16. The system of claim 15, further comprising at least one of said BH/VDs comprising—figurine resembling said celebrity whose voice at least resembles said sound.

17. The system of claim 16, further comprising said sounds to at least resemble a conversation between a first celebrity and a second celebrity.

18. The system of claim 16, further comprising said sounds as comments regarding at least one of sports event and exercise class and game show and wagering advice.

19. The system of claim 16, further comprising origin of said sound as at least one of list:
actual human celebrity speaking, celebrity voice impersonator speaking, electronic simulation of celebrity voice.

20. The system of claim 14, further comprising brand promotion.

21. A system having a hardware processor for communicating signals originating as sound waves of human voice, said system comprising processing of said signals by voice-over-internet protocol, said system further comprising cell-phone-casting of processed signals, further comprising at least one cell-phone-cast signal mirrored to at least one speaker comprised in the system, said at least one speaker comprising at least one attachable figurine resembling human whose voice originated said sound waves.

22. A system comprising a hardware processor and communication of words in voice of a first celebrity, said words delivered via internet, said delivery comprising signals mirrored from receiving cell phone comprised in the system to at least one external speaker functionally co-located with a figurine resembling said a first celebrity, said co-locating sufficient to render the location from which a user/listener hears sound of said first celebrity's words from said speaker to be at least virtually the same location at which celebrity-resembling figurine is present and viewable by user/listener.

\* \* \* \* \*